United States Patent [19]

Ninacs et al.

[11] Patent Number: 5,653,474
[45] Date of Patent: Aug. 5, 1997

[54] HIGH TEMPERATURE RECTANGULAR EXHAUST DUCT EXPANSION JOINT

[75] Inventors: Michel D. Ninacs, 190 Meloche St., Vaudreuil, Quebec, Canada, J7V 8P2; Rodney P. Bell, Campbellville, Canada

[73] Assignee: Michel D. Ninacs, Vaudreuil, Canada

[21] Appl. No.: 544,889

[22] Filed: Oct. 18, 1995

[51] Int. Cl.$^6$ .................................. F16L 11/12
[52] U.S. Cl. ...................... 285/47; 285/229; 285/301; 285/224
[58] Field of Search ........................ 285/229, 424, 285/414, 47, 299, 301, 226

[56] References Cited

U.S. PATENT DOCUMENTS

| | | | |
|---|---|---|---|
| 3,730,566 | 5/1973 | Kazmierski, Jr. et al. | 285/229 |
| 3,811,714 | 5/1974 | Pintard | 285/229 |
| 4,140,338 | 2/1979 | Kazmierski, Jr. et al. | 285/229 |
| 4,848,803 | 7/1989 | Bachmann | 285/47 |
| 5,209,503 | 5/1993 | Heibel et al. | 285/47 X |
| 5,358,284 | 10/1994 | Broyles | 285/47 |
| 5,378,026 | 1/1995 | Ninacs et al. | 285/47 |

FOREIGN PATENT DOCUMENTS 2927639  1/1981  Germany ..................... 285/229

Primary Examiner—Terry Lee Melius
Assistant Examiner—Heather Shackelford
Attorney, Agent, or Firm—Swabey Ogilvy Renault; Guy J. Houle

[57] ABSTRACT

A high temperature rectangular exhaust duct expansion joint structure for securement to a high temperature gas stream and particularly, but not exclusively, a turbine engine exhaust duct. The support flange structure incorporated in the duct has a connecting flange which defines opposed side walls of the rectangular support flange structure. A T-shape radial web is connected to an outer surface of the connecting flange. The radial web has a vertical wall component and a transverse end component extending beyond opposed sides of the vertical wall component and is connectable to a flexible membrane of the joint structure. The support flange has reinforced corner sections wherein the connecting flange and the vertical wall component of the T-shape radial web are of increased thickness to reduce thermal stress in the corner sections and to effectively redistribute the stress in the support flange.

14 Claims, 5 Drawing Sheets

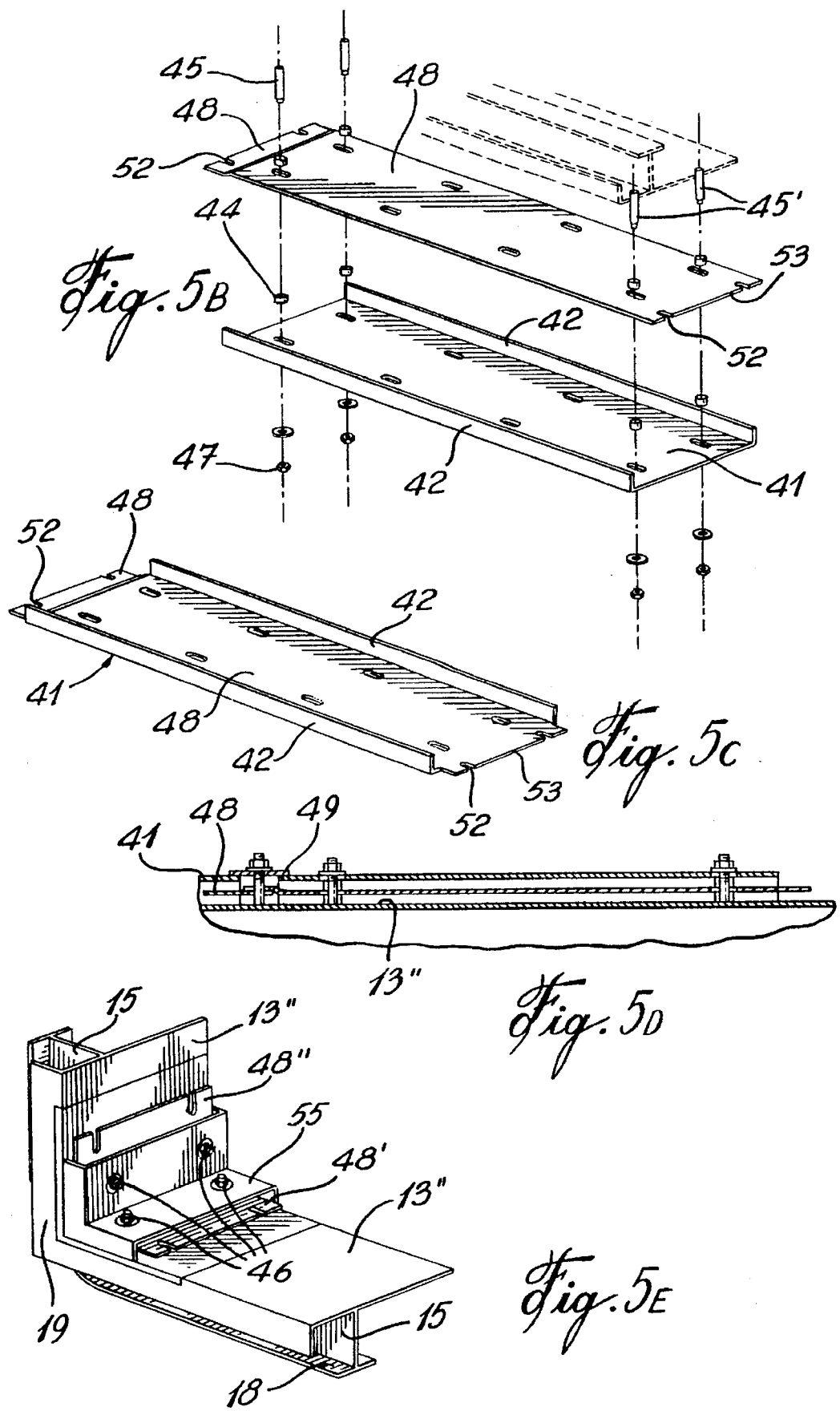

HIGH TEMPERATURE RECTANGULAR EXHAUST DUCT EXPANSION JOINT

TECHNICAL FIELD

The present invention relates to a rectangular support flange structure for use in a high temperature rectangular exhaust duct expansion joint for connection to an outlet structure of a high temperature gas stream and particularly, but not exclusively, to the exhaust duct of a gas turbine engine.

BACKGROUND ART

Gas turbine exhaust ducts must be connected to a ducting system through an expansion joint which is designed to provide stress relief caused by sudden thermal changes. These expansion joints also act as vibration isolators and compensate for minor misalignment of interconnecting ducts. They are constructed from a variety of metal parts and non-metallic materials including synthetic elastomers, fabrics, insulation materials and plastics, depending on their designs. Such exhaust duct expansion joints also have many applications such as for use in smelters, incineration plants, power generation plants, gas turbine plants and many more.

Because these joints are subjected to very rapid increase in internal exhaust gas temperatures, they are subjected to large temperature differentials within the joint structures, and these thermal gradients can cause stress levels in excess of yield. When a turbine is cycled frequently, such as during commissioning or as in peaking power units, the net result is deformation, crack propagation and gas leakage in some of the joint component parts.

A typical expansion joint uses a flexible composite membrane made from insulating and elastomeric materials to give the joint flexibility and sealing and it is attached to a steel structural support frame. There is generally a temperature limit for the materials that is considerably below the gas turbine exhaust temperature. Hence the material is normally attached to the duct via a radial web about 5" to 6" (12 cm to 15 cm) deep. This web allows the temperature to reduce radially outwards so that the temperature at the material attachment point is about 400° to 500° F. (220° to 280° C.) below the gas temperature. The joint also acts as a transition piece between parts of the exhaust duct that is insulated on the inside to where the duct is insulated on the outside. The main area of high stress is the down stream structure that is insulated on the outside only. At this point the web of the fabric support flange restricts the radial growth of the duct. The stresses in the other half of the joint where non-continuous insulated floating boxes are used to protect the duct from high temperatures, are much less.

In my U.S. Pat. No. 5,378,026 issued on Jan. 3, 1995, I discuss the construction of a circular expansion joint. A circular joint behaves very differently than a rectangular duct joint. Unlike a circular joint with the same radial temperature gradient, each side of the rectangular joint acts as a beam with a temperature gradient across it. Each side tries to bow inwards due to the thermal gradient. This bowing movement is restricted by the restraint at each corner. If the corners fully restrain the sides from bending, the maximum bending stress would be $$\sigma_b = \pm E\alpha \frac{\Delta T}{2}$$

where $\sigma_b$ is the bending stress, E is the modulus of elasticity, $\alpha$ is the expansion coefficient, and T is the temperature difference.

This stress is less than the same stress for a circular joint, but it only applies away from the corners. At the corners the stress level in the web increases significantly. This is because at the corner, the direct (hoop) stress that is in the duct and outer flange cannot be transmitted around the corner, and this force is transferred to the web at that point. The bending moment that was carried by the whole cross section is now carried by the web only, and the duct and flange direct stress drop to a low value. The stress increase can therefor be approximated by the ratio of the effective moment of inertia of the full joint cross section to that of the web only. For a typical section, this ratio would be about 4.5, so now the direct stress at the corners would be ($\sigma$ being the direct stress):

$$\sigma = 2.25 E\alpha \Delta T$$

This stress is now larger than the simple model used for the circular joint. In fact a better representation of the rectangular joint would produce an even higher stress due to twisting of the corners caused by the non-symmetrical shape of the cross section.

SUMMARY OF INVENTION

It is therefore a feature of the present invention to provide a metallic circumferential rectangular support flange structure for securing an expansion joint to an outlet structure of a high temperature gas stream and which substantially overcomes the above-mentioned stress concentration effects of conventional rectangular ducts.

Another feature of the present invention is to provide a metallic circumferential rectangular support flange structure having reinforced corner sections whereby to reduce thermal stress in the corner sections and to redistribute the stress in the support flange.

Another feature of the present invention is to provide a metallic circumferential rectangular support flange structure wherein the support flange thereof is provided with a T-shape radial web and wherein the flange and the vertical component of the T-shape radial web are of increased thickness in the corner sections to provide the above-mentioned advantages of relieving stress.

Another feature of the present invention is to provide a rectangular steel support flange structure and wherein a heat shield assembly is connected over an inner surface of the connecting flange to retard heat transfer to the support flange.

Another feature of the present invention is to provide a rectangular support steel flange structure in combination with an expansion joint and wherein the expansion joint has an insulated rectangular frame structure at the downstream end which is also provided with a heat shield assembly to retard heat transfer to the insulated rectangular frame structure.

Another feature of the present invention is to provide a rectangular support steel flange structure in combination with an expansion joint for connection to the outlet duct of a gas turbine and wherein the life expectancy of the expansion joint is greatly improved over prior art rectangular structures.

According to the above features, from a broad aspect, the present invention provides a metallic circumferential rectangular support flange structure for securing an expansion joint to an outlet structure of a high temperature gas stream. Said support flange structure having a connecting flange defining opposed side walls of the rectangular support flange structure. A T-shape radial web is connected to an outer surface of the connecting flange. The T-shape radial web has a vertical wall component and a transverse end component extending beyond opposed sides of the vertical wall component and connectable to a composite flexible joint structure. The support flange has reinforced corner sections wherein the connecting flange and the vertical wall component are of increased thickness to reduce thermal stress in the corner sections and redistribute the stress in the support flange.

BRIEF DESCRIPTION OF DRAWINGS

A preferred embodiment of the present invention will now be described with reference to the accompanying drawings in which:

FIG. 5B is an exploded view showing the construction of the intermediate heat absorbing plate;

FIG. 5C shows the intermediate heat absorbing plate secured to the metal liner;

FIG. 5D is a side section view showing the interconnection of two sections of the heat shield assembly;

FIG. 5E is a perspective view showing the interconnection of a corner section of the heat shield assembly.

DESCRIPTION OF PREFERRED EMBODIMENTS

Figure 1:
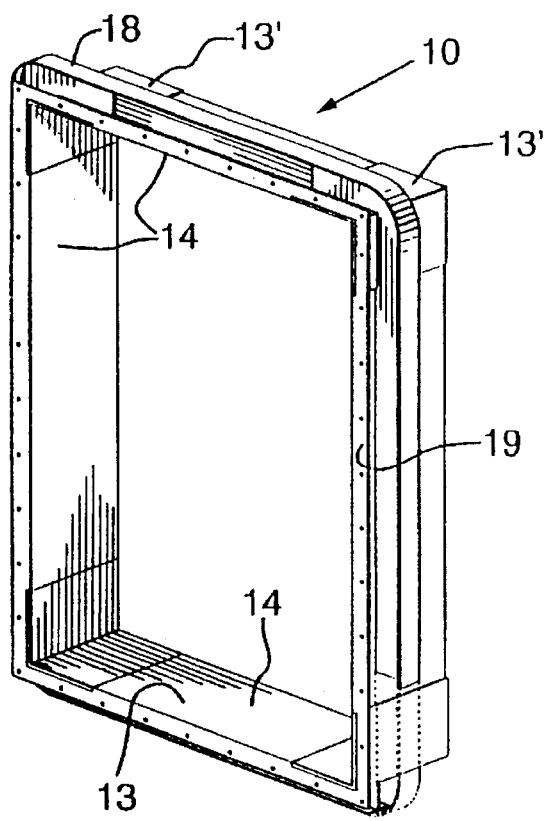
FIG. 1 is a fragmented simplified perspective view of the metallic circumferential rectangular support flange structure of the present invention.
Figure 2:
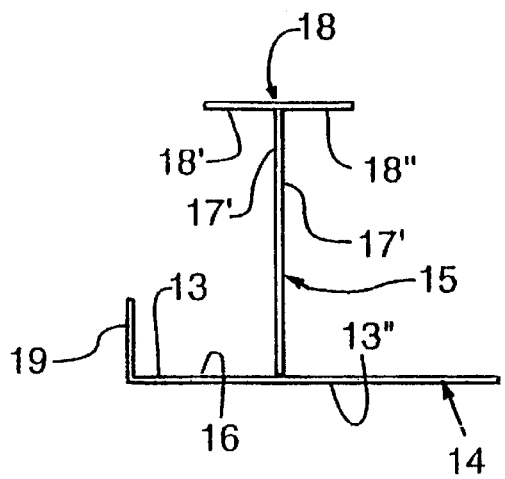
FIG. 2 is a simplified schematic cross-section view showing the construction of the rectangular support flange.
Figure 3:
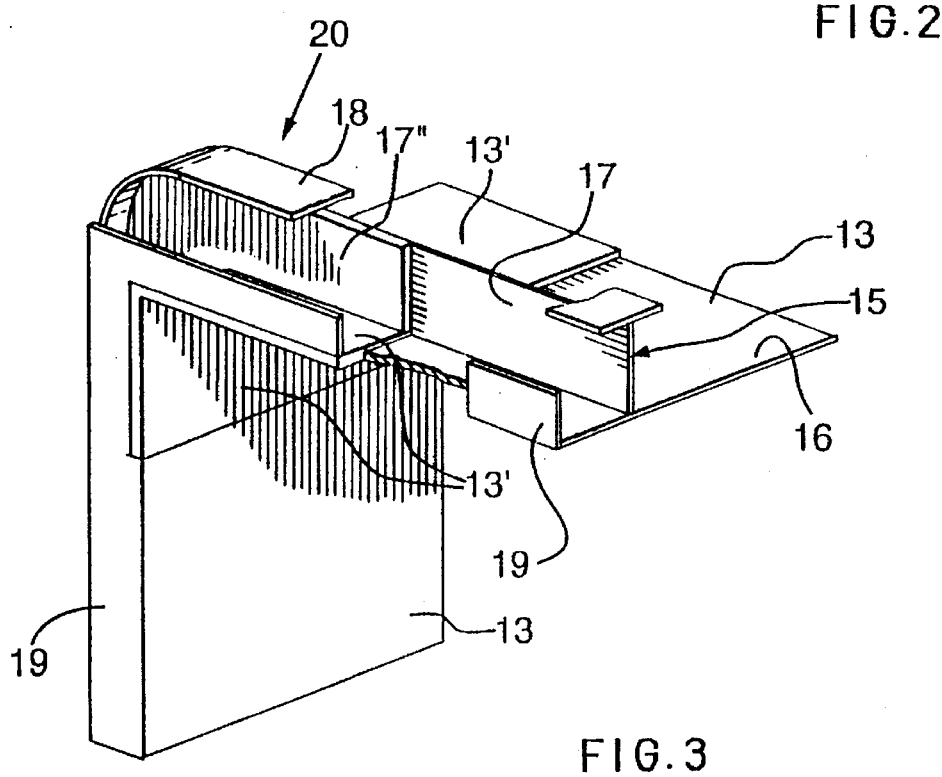
FIG. 3 is a partly fragmented corner section of the rectangular support flange structure illustrating the reinforced corner sections of the structure.
Figure 4:
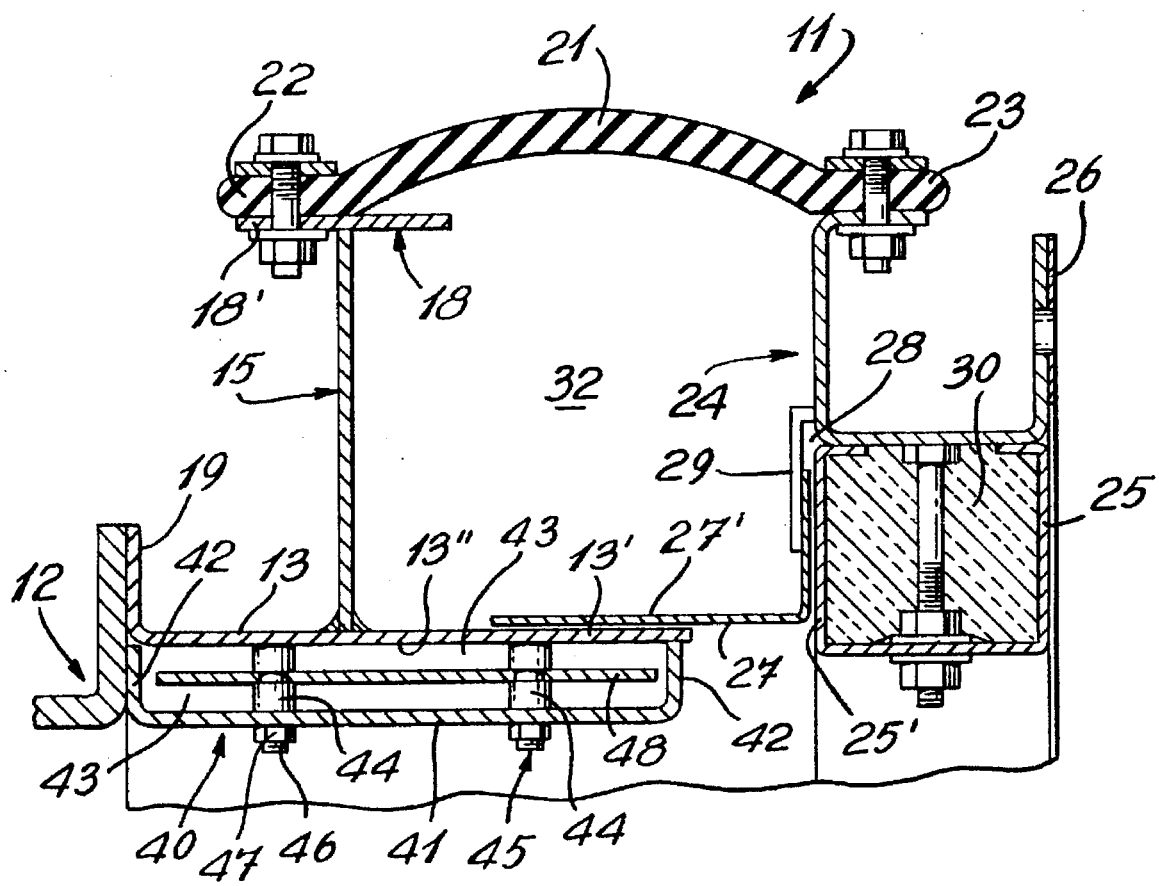
FIG. 4 is a simplified transverse section view showing the rectangular support flange structure secured in an expansion joint particularly constructed for securement to the outlet duct of a gas turbine engine.
Figure 6:
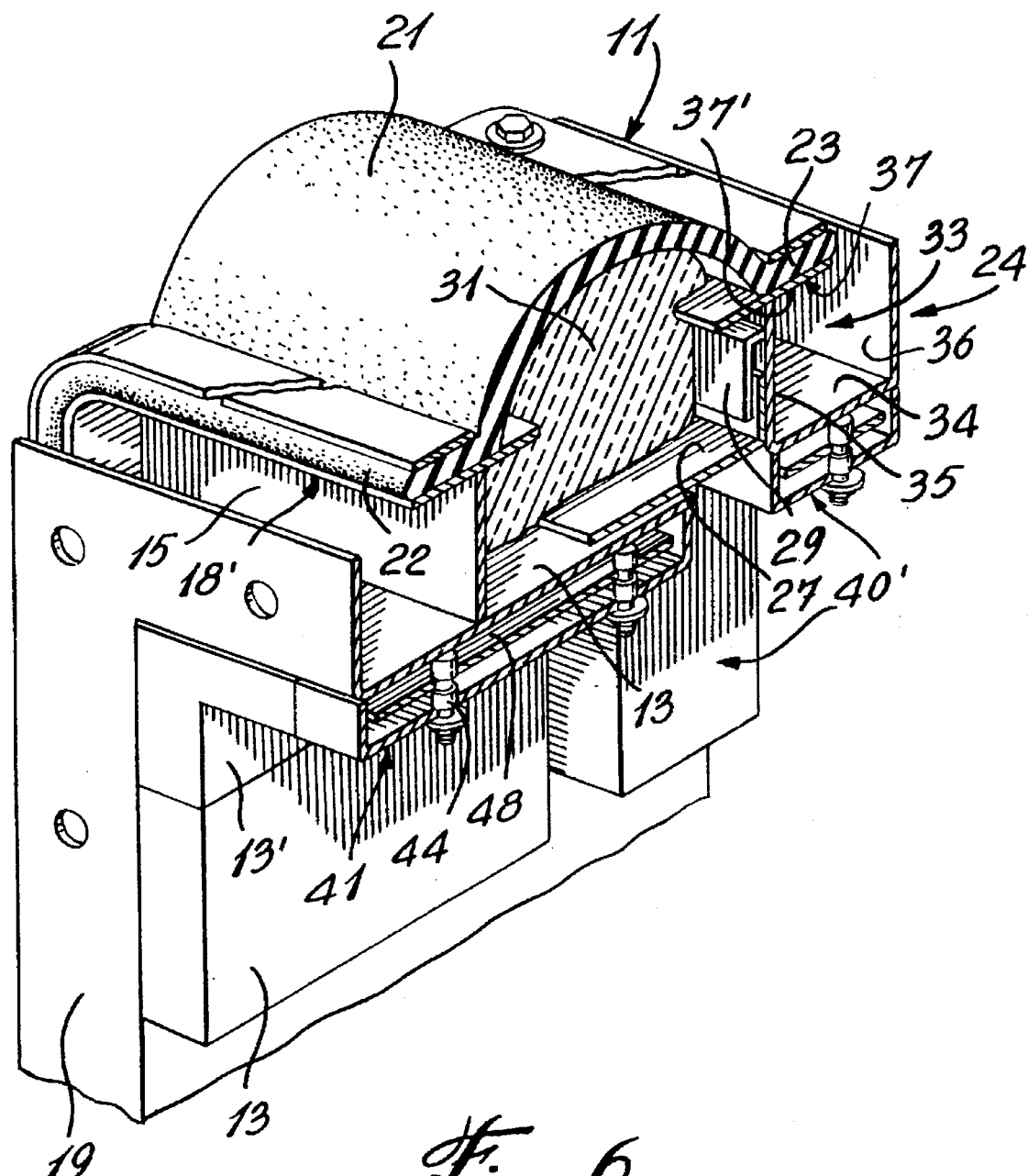
FIG. 6 is a perspective fragmented section view showing an expansion joint constructed in accordance with the present invention and wherein a T-shape radial web is also incorporated into the insulated rectangular frame structure at the downstream end of the expansion joint.

Referring now to the drawings and more particularly to FIGS. 1 to 3, there is shown generally at 10 the metallic circumferential rectangular support flange structure of the present invention for securing an expansion joint, as more clearly illustrated at 11 in FIGS. 4 and 6 to an outlet structure 12 of a high temperature gas stream generated by various means such as a gas turbine engine (not shown). The support flange structure 10 has a connecting flange 13 which defines the opposed side walls 14 of the rectangular support flange structure 10. The structure 10 is a steel structure.

As more clearly illustrated in the simplified view in FIG. 2, a T-shape radial web 15 is connected to an outer surface 16 of the connecting flange 14. The T-shape radial web has a vertical wall component 17 and a transverse end component 18 extending beyond opposed sides of the vertical wall component. In fact, the vertical wall component 17 is welded centrally along the transverse end component. The transverse end component 18 thereby defines a forward flange section 18' and a rearward flange section 18".

As can be seen, the connecting flange 13 has an inturned connecting flange 19 for connecting the expansion joint to a high temperature outlet structure 12, as shown in FIG. 4, and through which exhaust gas temperatures in the vicinity of about 1100° F. flow.

As shown more clearly in FIG. 3, the support flange structure is provided with reinforced corner sections 20 and this is provided by making the connecting flange 13 as well as the vertical wall component 17 of the T-shape radial web 15 of thicker steel as identified at 13' and 17" respectively. By reinforcing these corner sections 20 thermal stress in these areas is reduced and this also has the effect of redistributing the thermal stress in the connecting flange 13. The T-shape radial web 15 with its transverse end component 18 balances this stress within the connecting flange and the vertical wall component and prevents excess distortion due to thermal stress.

As can be seen from comparing FIGS. 1 and 2, the opposed side walls 14 of the support flange structure 10 are parallel side walls and the vertical wall component 17 of the T-shape radial web 15 extends transverse to the flat metal connecting plate or flange 13. In the embodiment as shown in FIGS. 4 and 6, the vertical wall component 17 is spaced closer to the inturned connecting flange 19 than to an opposed free end section 13' of the flat metal plate 13 but this spacing may vary depending on the application of the joint.

Referring now to FIGS. 4 and 6, there is shown the support flange structure 10 as incorporated into an expansion joint structure 11. As hereinshown the expansion joint structure comprises essentially a flexible membrane 21 which is secured along an edge 22 to the forward flange section 18' of the transverse end component 18. An opposed edge 23 of the flexible membrane is secured to an insulated rectangular frame structure 24 provided with an insulated housing 25 and a duct connecting flange 26 to connect to an outlet duct (not shown). An extension flange 27 projects inwardly from the insulated rectangular frame structure 24 to overlap at an end section 27' thereof with the free end section 13' of the support flange 13. The extension flange 27 is displaceably retained by the rectangular frame structure within a retention slot 28 defined between an inner side wall 25' of the insulated housing 25 and a spaced guide wall 29. A suitable insulating material 30 is disposed within the insulated housing 25.

A heat insulating bolster 31 (see FIG. 6), as is well known in the art, is disposed within the space 32 and retained captive between the connecting flange 13 and the projecting flange 27, at a lower end, and the flexible membrane 21 at an upper end. The bolster also spans between the T-shape radial web 15 and the inner face of the insulated rectangular frame structure 24.

As shown in FIG. 6, the insulator rectangular frame structure 24 is constructed slightly different from that as shown in FIG. 4 and is provided by a U-shaped connecting channel 33 defining a flat base wall 34 and opposed transverse side walls 35 and 36. The inner one of the transverse side walls, namely side wall 35 faces the insulating bolster 31 and is herein structured as a further T-shape web having a transverse flange 37 secured to a top end of the side wall 35 and projecting on opposite sides thereof. The opposed edge 23 of the flexible membrane 21 is connected to the outer projecting side 37' of the transverse flange. Again, the transverse flange is herein provided to balance stress in the U-shaped connecting channel 33. In this particular embodiment, the outer side wall 36 constitutes a duct connecting flange similar to the flange 26 of FIG. 4.

Referring now to FIGS. 4 and 5A to 5E, there is shown the construction of a heat shield assembly 40 connected over the inner surface 13" of the connecting flange 13 to retard heat transfer to the support flange assembly resulting in a further reduction in thermal stress in the support flange assembly. The heat shield assembly, as shown in FIG. 4, comprises essentially a metallic liner 41 herein formed of a plurality of steel plates, and each plate having inturned end flanges 42. The shield is connected to overlie the inner surface 13" of the connecting flange 13 with the inturned end flanges disposed over the inner surface 13" and defining an insulating air gap 43 between the side walls 14 or connecting flanges 13 and the steel plates or metal liner 41. The metal liner is retained by spacer cylinder 44 retained over projecting connectors 45, as better shown in FIG. 5A. The connectors have a threaded end 46 to receive securing nuts 47 thereto.

As also shown in FIG. 4, an intermediate heat absorbing plate 48 is secured in the air gap 43 between the spacer cylinders 44 and disposed substantially parallel between the flat steel plates or metal liner 41 and the inner surface 13" of the connecting flanges 13.

Figure 5A:
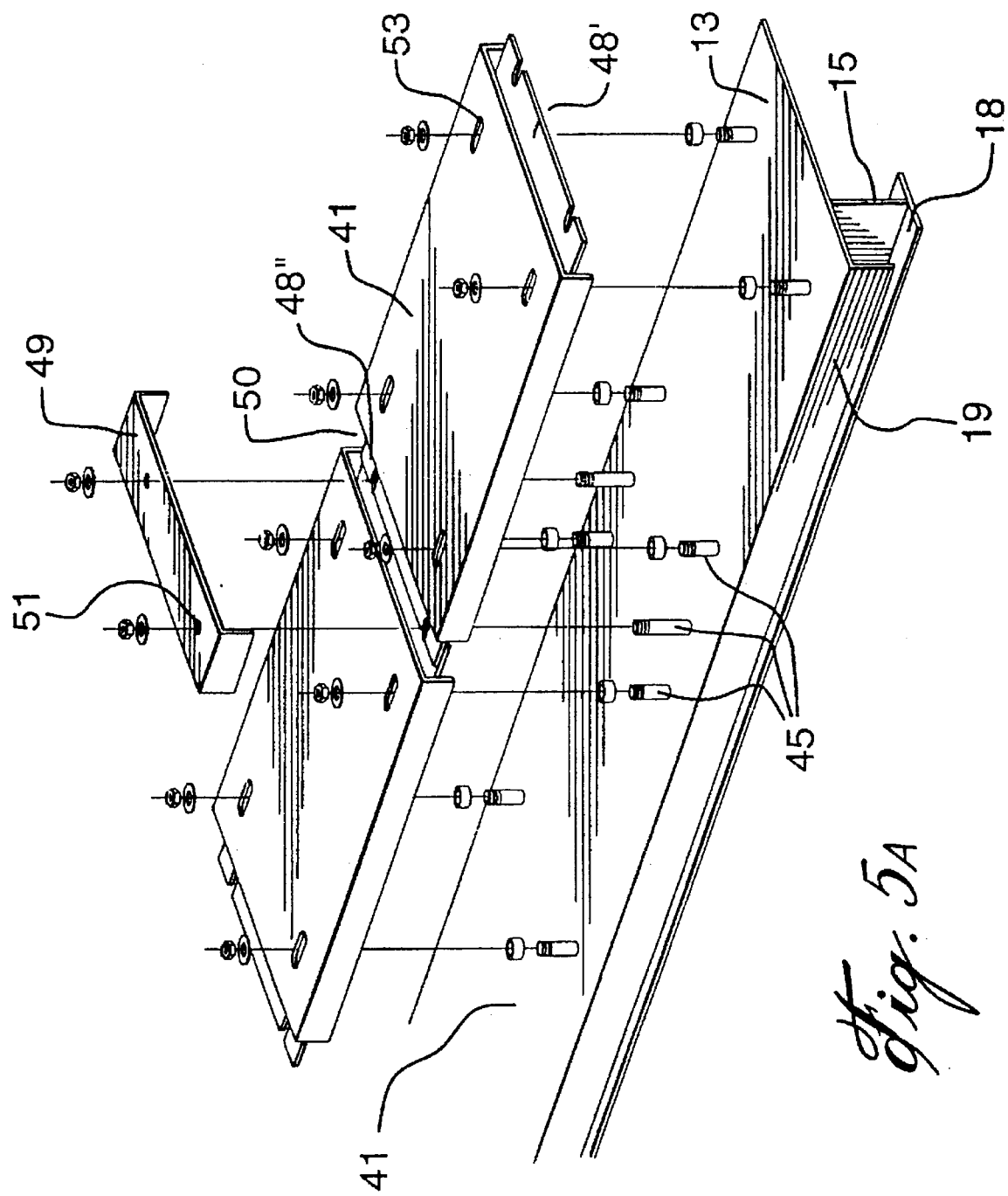
FIG. 5A is an exploded view showing certain component parts of a heat shield assembly.

FIGS. 5A to 5E illustrate how the heat shield assembly 40 is constructed. As shown in FIG. 5A, a plurality of connectors or spacer bolts 45 extend from the inner face of the connecting flange 13 to connect along each of the opposite side walls 14 a plurality of metal liners 41. The intermediate heat absorbing plates 48 are further provided with extension ends 48' which are offset at end 48" to overlap with intermediate plates of the adjacent liner 41 in a manner as better illustrated in FIG. 5D. A bridge cover plate 49 connects over the end gaps 50 between opposed metal liners 41. It is provided with holes 51 centrally thereof to receive the connecting bolts 45 which extends through the U-shaped slots 52 provided in the opposed edges 53 of each of the intermediate plates 48. These slots 52 as well as the holes 54 provided in the intermediate plates are sufficiently long to permit expansion of the plates. This is also the case with the holes 55 provided in the metallic liners 41. Accordingly, this heat shield assembly is constructed in such a way as it can permit displacement of the component parts due to thermal expansion and contraction of the metal when subjected to rapid heat increase and decrease.

FIG. 5E shows that the heat shield assembly also includes right angle corner sections 55 also provided with intermediate plates 48 with extension flanges 48', 48".

Simulated heat conditions were subjected to a circumferential rectangular support flange structure constructed as shown in FIG. 2 but without reinforced corner sections and with the top flange of the web extending only on the upstream side of the inturned connecting flange. A simulated exhaust gas temperature transient of 700° F. was reached in 10 seconds and 1000° F. was reached in 2 minutes with a steady state flow of gas at a temperature of 1050° F. The maximum stress intensity at the corner of a non-reinforced joint was calculated to be 243,315 psi. This is a stress concentration due in part to the duct wall and the material support flange having greatly reduced direct stress a the corner. The restraining bending moment was taken by the web 15 alone. A secondary cause of additional bending stress in the web 15 was due to the non-symmetrical structure that causes the corner section to roll inwards. Away from the corner the stress in the support flange was calculated to be about 60,000 psi. In practice, such stress would obviously cause buckling and plastic deformation of the elements of the support flange structure. With the improved design of the web 15, constructing it as a T-shape radial web, as shown in FIG. 3, the twisting moment in the web is substantially removed. This reduces the maximum stress to 150,000 psi from about 200,000 psi. By increasing the thickness of the corner sections of the support flange structure the maximum stress appeared away from the corners. For the basic design chosen, the corner thickness of the steel plates was increased from 0.25" to 0.75". The maximum stress then occurred in the material support flange and it had a value of about 65,000 psi. Increasing the thickness of the vertical wall component 17 of the T-shape radial web 15 as the effect of increasing the thermally induced restraining moment at the corners and the stress level at this point is increased. To further reduce stresses, a heat shield 40 was connected to the inner surface of the connecting flange 13. A further heat shield 40' was also connected to the base wall 34 of the insulated rectangular frame structure 24. Such heat shield assembly 40, using for example 1" thick insulation in the insulating air gaps 43 can be calculated to reduce the maximum stress to about 48,000 psi and the time of occurrence would now be 2,000 seconds after the gas turbine started, rather than 400 seconds for the conventional designs. The design as illustrated in FIGS. 4 and 6 results in an effective method of reducing the thermal stresses in a rectangular expansion joint to reasonable levels.

It is within the ambit of the present invention to cover any obvious modifications of the preferred embodiment described herein, provided such modifications fall within the scope of the appended claims.

We claim:

1. A metallic circumferential rectangular support flange structure for securing an expansion joint to an outlet structure of a high temperature gas stream, said support flange structure having a connecting flange defining opposed side walls of said rectangular support flange structure, a T-shape radial web having a vertical wall component connected along an edge to an outer radial surface of said connecting flange spaced from opposed longitudinal edges thereof and free of contact with said high temperature gas stream, said T-shape radial web also having a transverse end component connected to an opposed edge of said vertical wall component and connectable to a composite flexible joint structure, said transverse end component projecting from opposed sides of said vertical wall component to define a forward and a rearward flange section, said expansion joint being secured to said vertical wall component and isolated from said high temperature gas stream, said support flange structure having thickened reinforced corner sections to reduce thermal stress in said corner sections and to redistribute the stress in said support flange.

2. A support flange structure as claimed in claim 1 wherein said vertical wall component of said T-shape radial web is secured substantially at mid-width of said transverse end component.

3. A support flange structure as claimed in claim 2 wherein there is further provided a heat shield assembly connected over a radial inner surface of said connecting flange to retard heat transfer to said support flange structure, said heat shield assembly resulting in a reduction in thermal stress in said support flange structure.

4. A support flange structure as claimed in claim 2 wherein said connecting flange is a straight flat steel plate having a forward end with an outturned connecting flange for securing said expansion joint to said outlet structure, said T-shape radial web being constructed of steel material.

5. A support flange structure as claimed in claim 4 in combination with an outlet duct of a gas turbine generating for exhausting an exhaust gas at a temperature in the vicinity of ~1100° F., said outlet duct constituting said outlet structure.

6. A support flange structure as claimed in claim 4 wherein said opposed side walls of said support flange structure are parallel side walls, said vertical wall component of said T-shape radial web being disposed transverse to said flat steel plate and spaced closer to said inturned connecting flange than to an opposed free end section of said flat steel plate.

7. A support flange structure as claimed in claim 6 wherein said forward flange section of said transverse end component extends towards said outturned connecting flange and constitutes a flexible web connecting flange section.

8. A support flange structure as claimed in claim 2 in combination with said expansion joint, said expansion joint comprising a flexible membrane having an upstream and downstream edge, said upstream edge being secured to said forward flange section of said transverse end component, said downstream edge of said flexible membrane being secured to an insulated rectangular frame structure having an insulated housing and a duct connecting means, an extension flange attached to said rectangular frame extending in the forward direction having an end section, said connecting flange having a free end section, said end section of said extension flange projecting inwardly to overlap with said free end section of said connecting flange wherein said extension flange is retained by said rectangular frame structure, a heat insulating bolster having a radial inner and outer ends and retained captive between said connecting flange and said extension flange at said radial inner end and said flexible membrane at said radial outer end, said bolster spanning between said T-shape radial web and said insulated rectangular frame structure.

9. A support flange structure as claimed in claim 8 wherein said insulated rectangular frame structure has a U-shaped connecting channel defining a flat base wall and opposed transverse side walls, a forward one of said transverse side walls facing said insulating bolster having a transverse flange extending radially outwardly and projecting from opposed sides of said transverse side wall to define a forward and rearward flange section and secured to said end thereof, said downstream edge of said flexible membrane being connected to the rearward flange section of said transverse flange, said transverse flange and said forward one of said transverse side wall balancing stress in said U-shaped connecting channel.

10. A support flange structure as claimed in claim 9 wherein a rearward one of said transverse side wall constitutes said duct connecting means.

11. A support flange structure as claimed in claim 9 wherein there is further provided a heat shield assembly connected over said radial inner surface of said connecting flange to retard heat transfer to said U-shaped connecting channel resulting in a reduction in thermal stress in said U-shaped connecting channel.

12. A support flange structure as claimed in claim 3 wherein said heat shield assembly comprises a metallic liner formed by a plurality of interconnected flat steel plates having outturned end flanges and connected to overlie a radial inner surface of said opposed side walls of said rectangular support flange structure with said outturned end flanges abutting said radial inner surface of said side walls to define an insulating air gap between said side walls and said steel plates.

13. A support flange structure as claimed in claim 12 wherein there is further provided an intermediate heat absorbing plate secured in said air gap, said intermediate heat absorbing plate being spaced substantially parallel between said flat steel plates and said radial inner surface of said connecting flange.

14. A support flange structure as claimed in claim 13 wherein a plurality of said flat steel pates and intermediate heat absorbing plates are constructed in sections, wherein said flat steel plates are interconnected end-to-end and the intermediate heat absorbing plates are interconnected end-to-end over each said opposed side walls of said rectangular support flange structure, there being right-angle corner sections secured over said reinforced corner sections of said support flange structure.

* * * * *